Apr. 17, 1923.
R. HENRY
COTTON CHOPPING MACHINE
Filed June 30, 1921
1,452,046
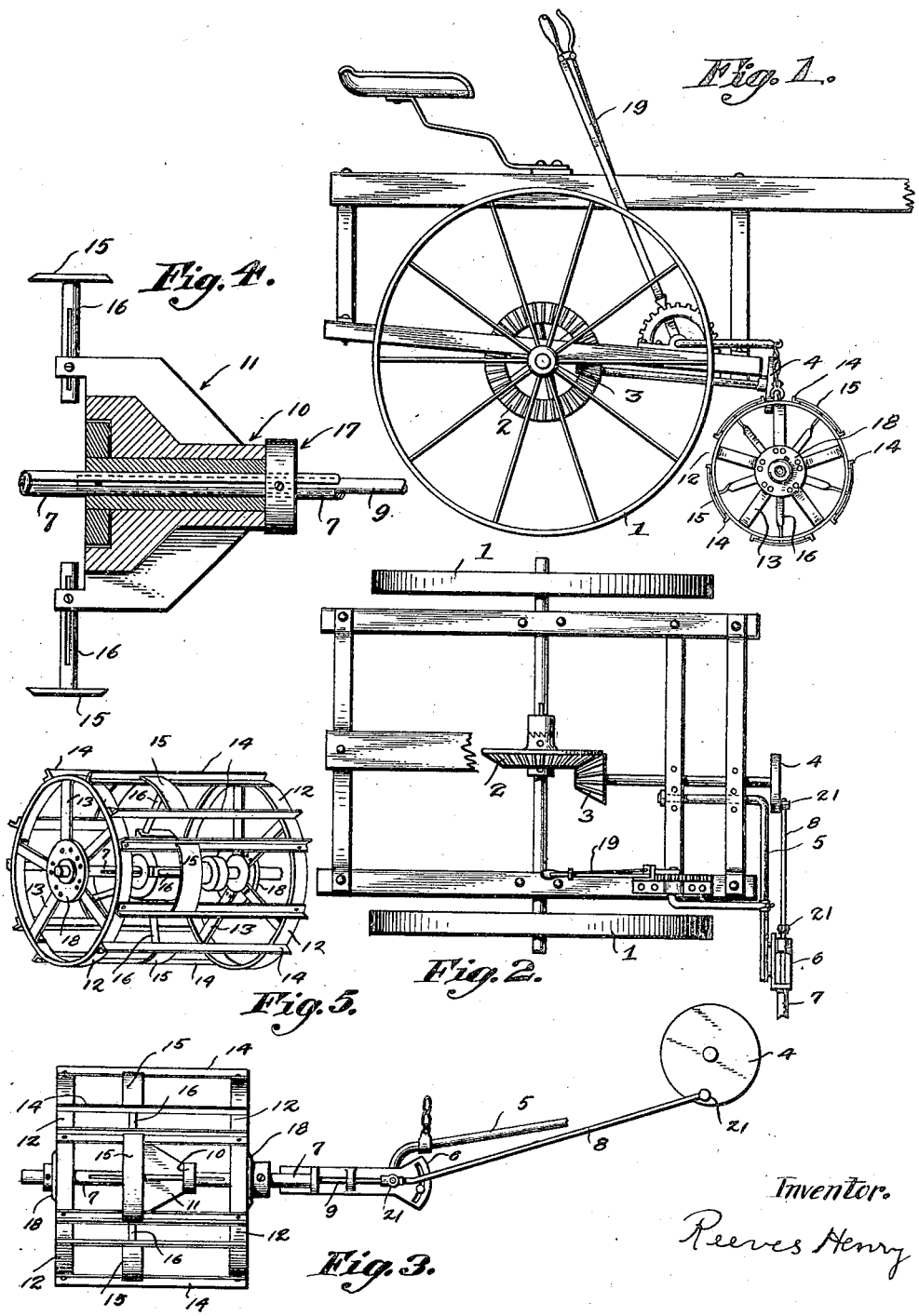

Patented Apr. 17, 1923.

1,452,046

UNITED STATES PATENT OFFICE.

REEVES HENRY, OF FORNEY, TEXAS.

COTTON-CHOPPING MACHINE.

Application filed June 30, 1921. Serial No. 481,637.

*To all whom it may concern:*

Be it known that I, REEVES HENRY, a citizen of the United States, residing at Forney, in the county of Kaufman and State of Texas, have invented a new and useful Cotton-Chopping Machine, of which the following is a specification.

My invention relates to improvements in cotton-chopping machines, and has for its object to render the growing of cotton more expeditious and considerably cheaper.

The objects of my improvements are, first, to provide a reel carrying reciprocating knives spaced to leave cotton plants or other small plants grown in a drill, at fixed intervals; second, to afford facilities for regulating the depth to which the knives cut under the surface of the soil; third, to afford facilities for adjusting the knives to vary the distance between plants as may be desired.

I attain these objects by the mechanism illustrated in the accompanying drawing, in which Figure 1 is an elevation of the working parts of the entire machine; Figure 2, a plan view of the machine showing driving wheels, gears, crank-wheel, pitman and its connections, cross-head guide and lifting bar; Figure 3, an elevation of the reel with connections; Figure 4, a cross section of hub, carrying adjustable knives and arms; Figure 5, a detailed view in perspective of the reel with knives and spacing bars.

Similar numerals refer to similar parts throughout the several views.

The wheels 1, 1, support the frame-work of the machine. 2 and 3 are bevel gears, 4 is crank wheel; 5 is lifting bar; 6 cross-head guide; 7 hollow shaft; 8 pitman connecting crank wheel 4 with piston rod 9; 10 is hub with brackets 11, connected to piston-rod 9; 12, 12, are bands or hoops forming with bars 13 and angle irons 14 the frame of reel shown in Figures 3 and 5; 15, 15, 15, 15, are knives attached to bracket 11 by slotted arms 16; 17 is a double flanged spool or cross-head attached to piston 9 by a pin through slots 20 in hollow shaft 7; 18, 18, are discs, forming bearings of reel turning on hollow shaft 7 in Figures 1, 3 and 5; 21, 21, are wrist pins connecting pitman with 4 and 9.

The mechanism is set in motion as follows:

The drive wheels 1, 1, rotate gears 2, 3, which rotate crank wheel 4, which produces oscillating motion in piston rod 9, by pitman 8. Hub 10, carrying knives 15, pinned to piston rod 9, travels space between bands 12, 12 with a horizontal, oscillating motion. Hub 10 revolves on a double flanged spool or cross head pinned to piston 9. The forward motion of the reel brings the knives 15, alternately in contact with the soil, leaving narrow spaces between angle irons 14, 14, 14, 14, untouched.

Cross head guide 6, is provided with a slotted end, and being connected to lifting bar 5 by a wrist pin, the connection of reel shaft 7 is flexible, allowing reel to accommodate itself to irregularities of the soil. Lever 19 and lifting bar 5, lift the reel entirely from the ground when necessary.

Bevel gears are also provided with clutch 22 so that mechanism may be disengaged when not in use. The clutch 22 forms no part of my present invention.

The use of the machine is as follows: Cotton or any other small plants sown thickly in drills may be thinned to any desired distance between the plants by varying the diameter of the reel. The width of knives, and distance between angle irons.

The machine is propelled astride of one row, and reel is arranged to travel along the next adjoining row. By means of movable collars, the reel may be adjusted to accommodate rows planted at different distances apart. The forward motion of the machine causes reel to roll along and the knives are successively brought in contact with the ground. The reciprocal motion removes all plants and weeds to a width corresponding to the length of the knife-blade, and plants occupying space between the angle irons are untouched.

I am aware that prior to my invention the principle of reciprocating knives has been applied to grass and grain cutting machines, also, that revolving knives have been applied to cotton-chopping machines. I therefore do not claim such combination broadly.

In my invention the cutting is not produced by revolving motion.

Having thus described my invention, I claim:

1. In a cotton chopping machine, a hollow slotted shaft, acting as guide for piston attached to a double flanged cross head.

2. In a cotton chopping machine, a double flanged cross head, movable laterally on a hollow slotted shaft.

3. In a cotton chopping machine, a hub, bearing double edged knives, rotatably mounted on a double flanged cross head.

4. In a cotton chopping machine, in combination, a hollow slotted shaft, a double flanged cross head movable laterally on said shaft, a hub, bearing double edged knives rotatably on said laterally movable cross head, substantially as described.

REEVES HENRY.